(12) United States Patent
Deng et al.

(10) Patent No.: US 10,715,071 B2
(45) Date of Patent: Jul. 14, 2020

(54) METHOD AND APPARATUS FOR GENERATING MOTOR DRIVE SIGNAL

(71) Applicant: AAC Technologies Pte. Ltd., Singapore (SG)

(72) Inventors: Hanlin Deng, Shenzhen (CN); Liang Jiang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 0 days.

(21) Appl. No.: 16/236,302

(22) Filed: Dec. 28, 2018

(65) Prior Publication Data

US 2019/0207547 A1 Jul. 4, 2019

(30) Foreign Application Priority Data

Jan. 4, 2018 (CN) .......................... 2018 1 0006498

(51) Int. Cl.
*H02P 25/032* (2016.01)
*H02P 25/04* (2006.01)

(52) U.S. Cl.
CPC ............ *H02P 25/032* (2016.02); *H02P 25/04* (2013.01)

(58) Field of Classification Search
CPC ............................... H02P 25/032; H02P 25/04
USPC .................................................. 318/727, 34
See application file for complete search history.

(56) References Cited

U.S. PATENT DOCUMENTS

| 6,433,461 B1* | 8/2002 | Shibatani | ............ H01L 41/0906 310/317 |
| 6,617,754 B1* | 9/2003 | Knauss | .................. H02N 2/062 310/316.02 |

* cited by examiner

*Primary Examiner* — David Luo
(74) *Attorney, Agent, or Firm* — IPro, PLLC; Na Xu (57) ABSTRACT

A method for generating a motor drive signal is disclosed, which includes: obtaining a non-resonance frequency sine signal, and inputting the non-resonance frequency sine signal into a first system; processing, by the first system, the non-resonance frequency sine signal to obtain a correction input signal; inputting the correction input signal into a second system, and processing, by the second system, the correction input signal to obtain an output signal in the same mathematical form as the non-resonance frequency sine signal, wherein the first system is an inverse system of the second system; and using the output signal of the second system as the motor drive signal. The present disclosure further provides an apparatus for generating a motor drive signal. The method and apparatus for generating a motor drive signal enable the motor to have a smooth output effect after being excited by the non-resonance frequency sine signal.

8 Claims, 9 Drawing Sheets

METHOD AND APPARATUS FOR GENERATING MOTOR DRIVE SIGNAL

TECHNICAL FIELD

Embodiments of the present disclosure relate to the field of electronic device technologies, and in particular, to a method and an apparatus for generating a motor drive signal.

BACKGROUND

Vibration is a primary manner by which electronic devices transmit tactual stimulation to the human body. A Motor has been widely applied, as an important device, to a mobile phone, a tablet computer, a smart wrist watch, a game joystick, and VR glasses, so as to provide matched vibration effects under different application scenarios, thereby providing to a user with a vivid and rich experience. When a motor is driven by a sine signal with a single frequency, the motor vibration output signal envelope monotonously increases to a stable state, i.e. a smooth output, if the frequency of the sine signal is the same as a resonance frequency. However, since there is only one frequency for the output signal, the output effect is excessively monotonous. To enrich frequency components of the output signal, a method for obtaining a motor vibration output signal by exciting a motor system with a non-resonance frequency sine signal is provided. In this way, the user is provided with rich experiences.

However, the inventor finds that there are several problems in the prior art: the non-resonance frequency sine signal is directly input into the motor system, and thus there will be a phenomenon of rapid rise and fall for the motor vibration output signal envelope before entering the stable state, which is an oscillating but not smooth output, and thus making people feel disharmonious.

BRIEF DESCRIPTION OF THE DRAWINGS

One or more embodiments are exemplarily described with reference to figures in the accompanying drawings corresponding to the embodiments. These exemplary descriptions do not constitute a limitation on the embodiments. Components having the same reference numeral in the accompanying drawings are represented as similar components. Unless particularly stated, the figures in the accompanying drawings do not constitute a scale limitation.

DETAILED DESCRIPTION

To make the objects, technical solutions, and advantages of the embodiments of the present disclosure clearer, the embodiments of the present disclosure will be described in detail with reference to the accompanying drawings as follows. However, those skilled in the art will understand that many technical details are provided in the embodiments of the present disclosure to facilitate the understanding of the reader to the present disclosure. However, the technical solutions sought to be protected by the present disclosure could be implemented even without such technical details and various changes and modifications based on the following embodiments.

Figure 1:
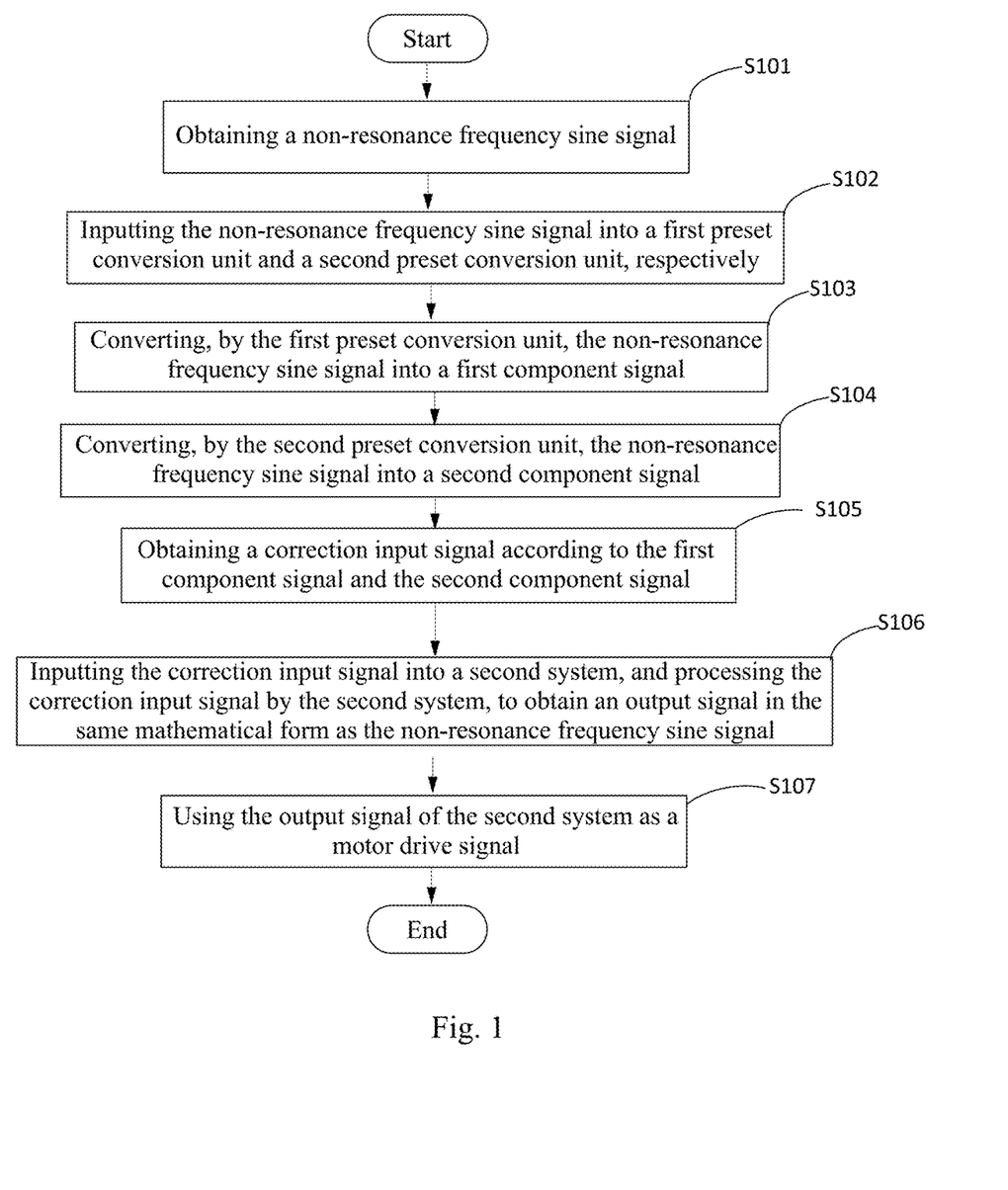
FIG. 1 is a flowchart of a method for generating a motor drive signal according to the first embodiment of the present disclosure.

The first embodiment of the present disclosure relates to a method for generating a motor drive signal. The specific process is shown in FIG. 1.

At S101, a non-resonance frequency sine signal is obtained.

Specifically, in step S101, a motor is abstracted as a spring vibrator system with damping. The self-resonance frequency of the motor is $f_0 = \sqrt{k(1-\zeta^2)4\pi^2 m}$, wherein, k is a stiffness coefficient of a spring, m is the mass of the spring vibrator. In this way, the non-resonance frequency sine signal is selected, and Laplace Transform is performed on the non-resonance frequency sine signal for further process by the first system.

At S102: the non-resonance frequency sine signal is input into a first preset conversion unit and a second preset conversion unit, respectively.

Specifically, in step S102, the first preset conversion unit and the second preset conversion unit constitute the first system, and the first preset conversion unit may be a cophase component operational amplifier, and the second preset conversion unit may be a quadrature component operational amplifier.

At S103: the non-resonance frequency sine signal is converted into a first component signal by the first preset conversion unit.

Specifically, in step S103, the non-resonance frequency sine signal is input to a cophase input of the first preset conversion unit, attenuated according to a certain ratio, and then fed into a reverse-phase input of the first preset conversion unit; and a cophase component signal in the form of $v_1(t) = A_1 \sin \omega_c' t$ may be obtained by adjusting the amplitude of the non-resonance frequency sine signal, where $v_1(t)$ is the cophase component signal, $A_1$ is the amplitude of the cophase component signal, and $\omega_c$ is the angular velocity of the non-resonance frequency sine signal.

At S104: the non-resonance frequency sine signal is converted into a second component signal by the second preset conversion unit.

Specifically, in step S104, the phase of the non-resonance frequency sine signal is changed with a preset angle by a phase shift circuit. The phase shift circuit may perform phase shift by using a capacitor or an inductor. The following description is provided by taking the capacitor as an example. After the capacitor is energized, it will be charged by the circuit. At the beginning, the instantaneous charging current for the capacitor is maximum, and the voltage across the capacitor tends to be 0. As the charging capacity of the capacitor increases, the current gradually decreases, and the voltage gradually increases. After charging for the capacitor is completed, the charging current of the capacitor tends to be 0, and the voltage across the capacitor is maximum. In this way, a charging cycle is completed. If the voltage across the capacitor is taken as an output, a phase shift voltage, which lags the current by 90 degrees, is obtained.

It should be noted that the non-resonance frequency sine signal phase-shifted by the phase shift circuit is converted into a signal with the same frequency and peak amplitude as the original non-resonance frequency sine signal but with the phase difference of 90 degrees from the original non-resonance frequency sine signal, and the amplitude of the signal is further required to be adjusted by the quadrature component operational amplifier, thereby obtaining a quadrature component signal in a form of $v_2(t)=A_2 \cos \omega_c t$, where $v_2(t)$ is the quadrature component signal, $A_2$ is amplitude of the quadrature component signal, and $\omega_c$ is the angular velocity of the non-resonance frequency sine signal.

At S105, a correction input signal is obtained according to the first component signal and the second component signal.

Specifically, in step S105, the first component signal and the second component signal are input into an adder. The adder performs linear superimposition, and it does not generate a signal with a new frequency when performing output, thus avoiding finally generating a correction input signal with a frequency different from that of the non-resonance frequency sine signal due to the generation of signal with a new frequency, and ensuring the signal input into the second system in the same mathematical form as the non-resonance frequency sine signal.

Preferably, a correction pulse signal may be set according to the first component signal and the second component signal, and the first component signal, the second component signal and the correction pulse signal may be added to obtain the correction input signal, so that amplitude of the finally obtained correction input signal is maintained in a range realizable by actual devices due to the correction by the correction pulse signal.

At S106, the correction input signal is input into and processed by the second system, so as to obtain an output signal in the same mathematical form as the non-resonance frequency sine signal.

Specifically, in step S106, the first system is an inverse system of the second system, and the specific relationship therebetween is:

$$H_K^{-1}(s) = \frac{K}{H(s)},$$

where $H_K^{-1}(s)$ is the first system, H(s) is the second system, and K is a constant scale factor.

At S107, the output signal of the second system is used as the motor drive signal.

A correction input signal is obtained by obtaining a non-resonance frequency sine signal, inputting the non-resonance frequency sine signal into the first system and processing the non-resonance frequency sine signal input into the first system; and then the correction input signal is input into and processed by the second system, thereby obtaining the output signal in the same mathematical form as the non-resonance frequency sine signal, that is, the output signal of the motor. The first system is the inverse system of the second system, and thus, the product of the system transfer functions of the first system and the second system is a constant, so that the phase and frequency of the non-resonance frequency sine signal would not change after being processed by the first system, in other words, the correction input signal is in the same mathematical form as the non-resonance frequency sine signal. The correction input signal is then input into the second system for further processing, and the obtained output signal is also in the same mathematical form as the non-resonance frequency sine signal, in other words, the frequency of the output signal is the same as the that of the non-resonance frequency sine signal, thereby avoiding a phenomenon of rapid rise and fall caused by the frequency difference of the output signal and the frequency of the non-resonance frequency sine signal, and thus the motor has a smooth output.

Figure 2:
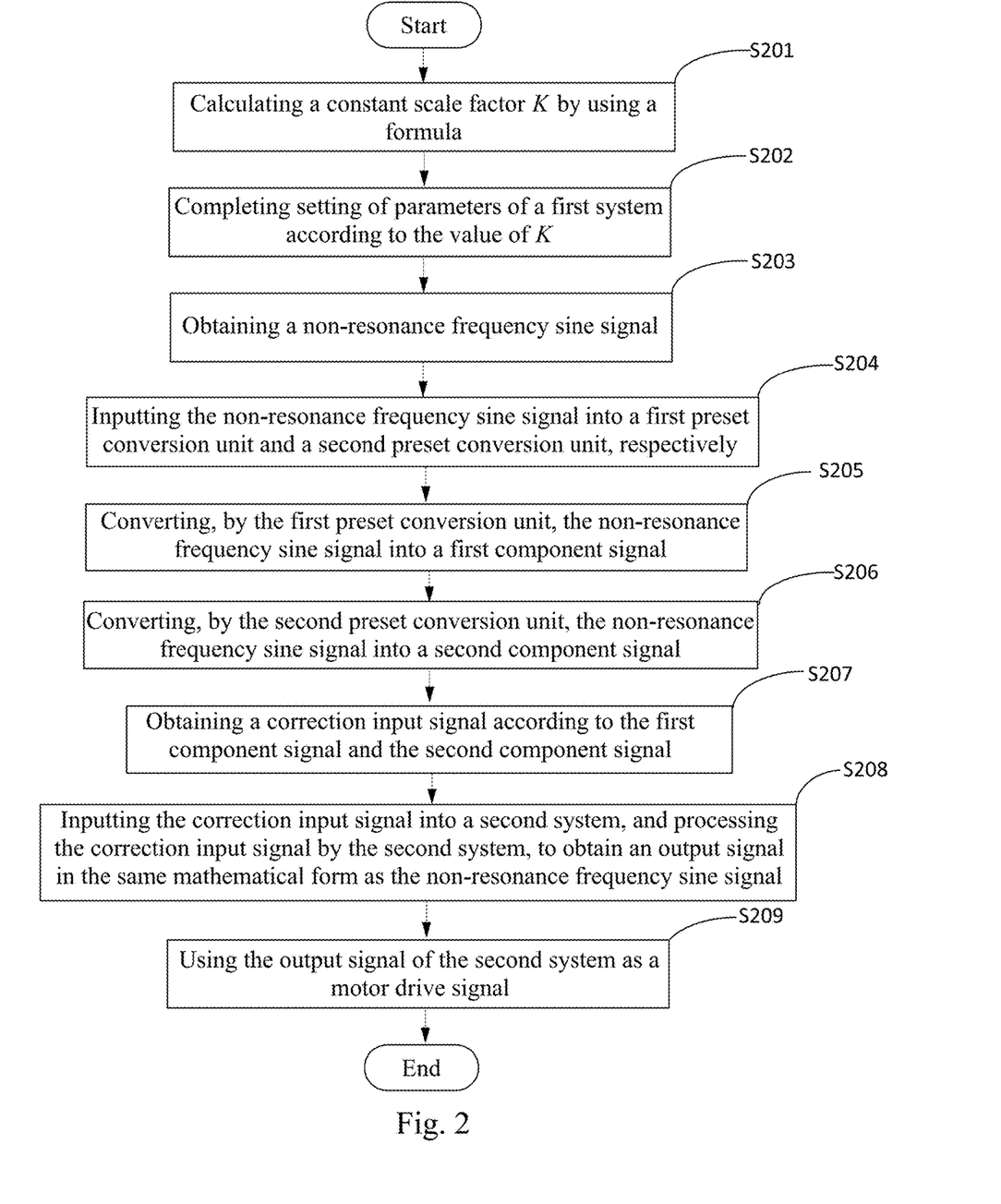
FIG. 2 is a flowchart of a method for generating a motor drive signal according to the second embodiment of the present disclosure.

The second embodiment of the present disclosure relates to a method for generating a motor drive signal. This embodiment is further improved based on the first embodiment. Specifically, in this embodiment of the present disclosure, the constant scale factor K is further limited, the value of K is calculated by using respective parameters of the motor, thereby avoiding un-realization of the smooth output of motors in actual devices due to the excessively large amplitude of the correction input signal. A specific process of this embodiment is shown in FIG. 2, which includes the following steps.

At S201, a constant scale factor K is calculated by using the following formula:

$$K = \frac{Bl}{mR_\theta \omega_n^2},$$

where m is the mass of a spring vibrator, B is the magnetic induction intensity, l is the length of the energized wire, $R_\theta$ is a loop resistance, and $\omega_n$ is an undamped natural frequency.

Specifically, in step S201, the constant scale factor K is calculated by using the parameters of the motor according to a certain calculation formula, so that the amplitude of the correction input signal is maintained in a range realizable by an actual device, thereby avoiding un-realization of the smooth output of motors in actual devices due to the excessively large amplitude of the correction input signal.

At S202, parameters of the first system are configured according to the value of K.

At S203, a non-resonance frequency sine signal is obtained.

At S204, the non-resonance frequency sine signal is input into a first preset conversion unit and a second preset conversion unit respectively.

At S205, the non-resonance frequency sine signal is converted into a first component signal by the first preset conversion unit.

At S206, the non-resonance frequency sine signal is converted into a second component signal by the second preset conversion unit.

At S207, a correction input signal is obtained according to the first component signal and the second component signal.

At S208, the correction input signal is input into and processed by the second system, so as to obtain an output signal in the same mathematical form as the non-resonance frequency sine signal.

At S209, the output signal of the second system is used as the motor drive signal.

Steps S203 to step S209 are similar to steps S101 to step S107, which intend to obtain the non-resonance frequency sine signal, process the non-resonance frequency sine signal by the first system, and input the processed correction input signal into the second system for further processing, so as to obtain the output signal in the same mathematical form as the non-resonance frequency sine signal. Details thereof will not be described herein.

Figure 3:
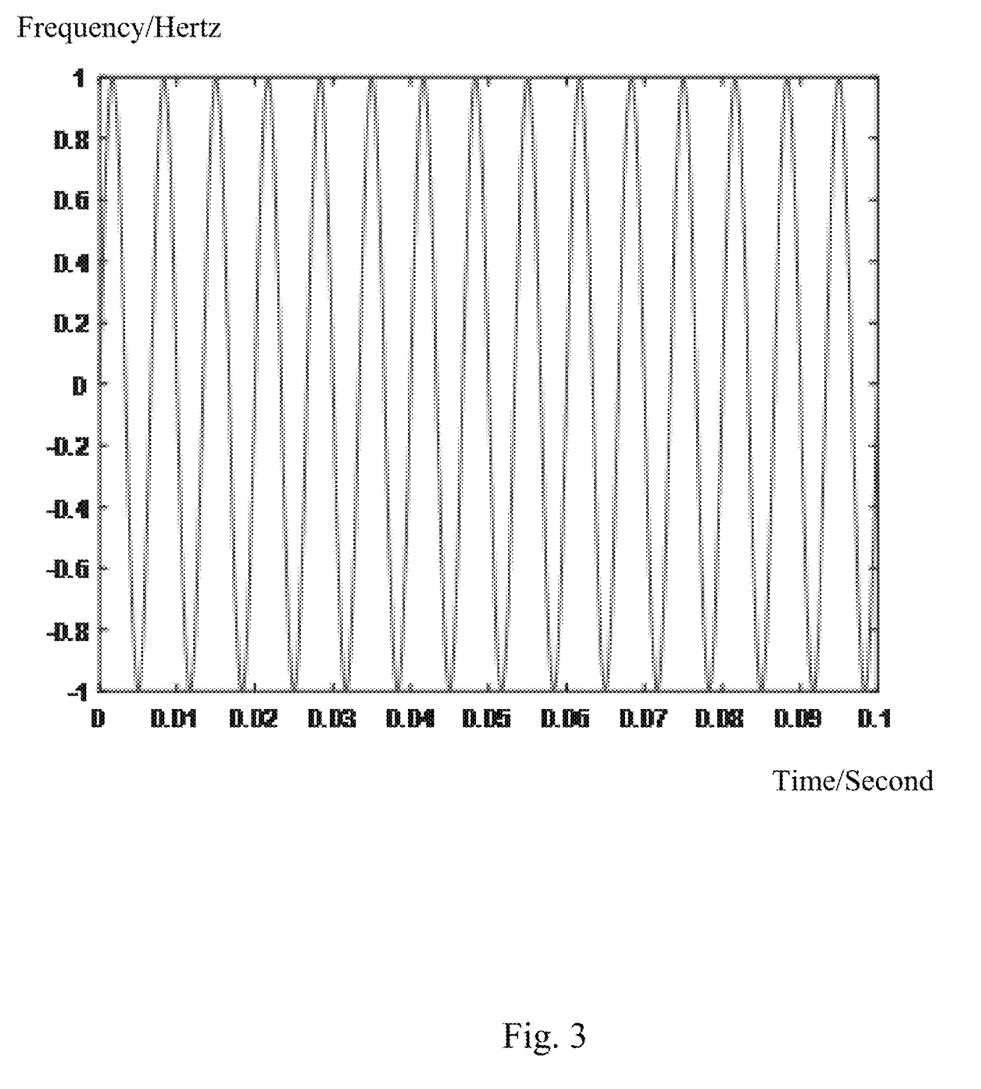
FIG. 3 is a waveform graph of a first input signal according to the second embodiment of the present disclosure.
Figure 4:
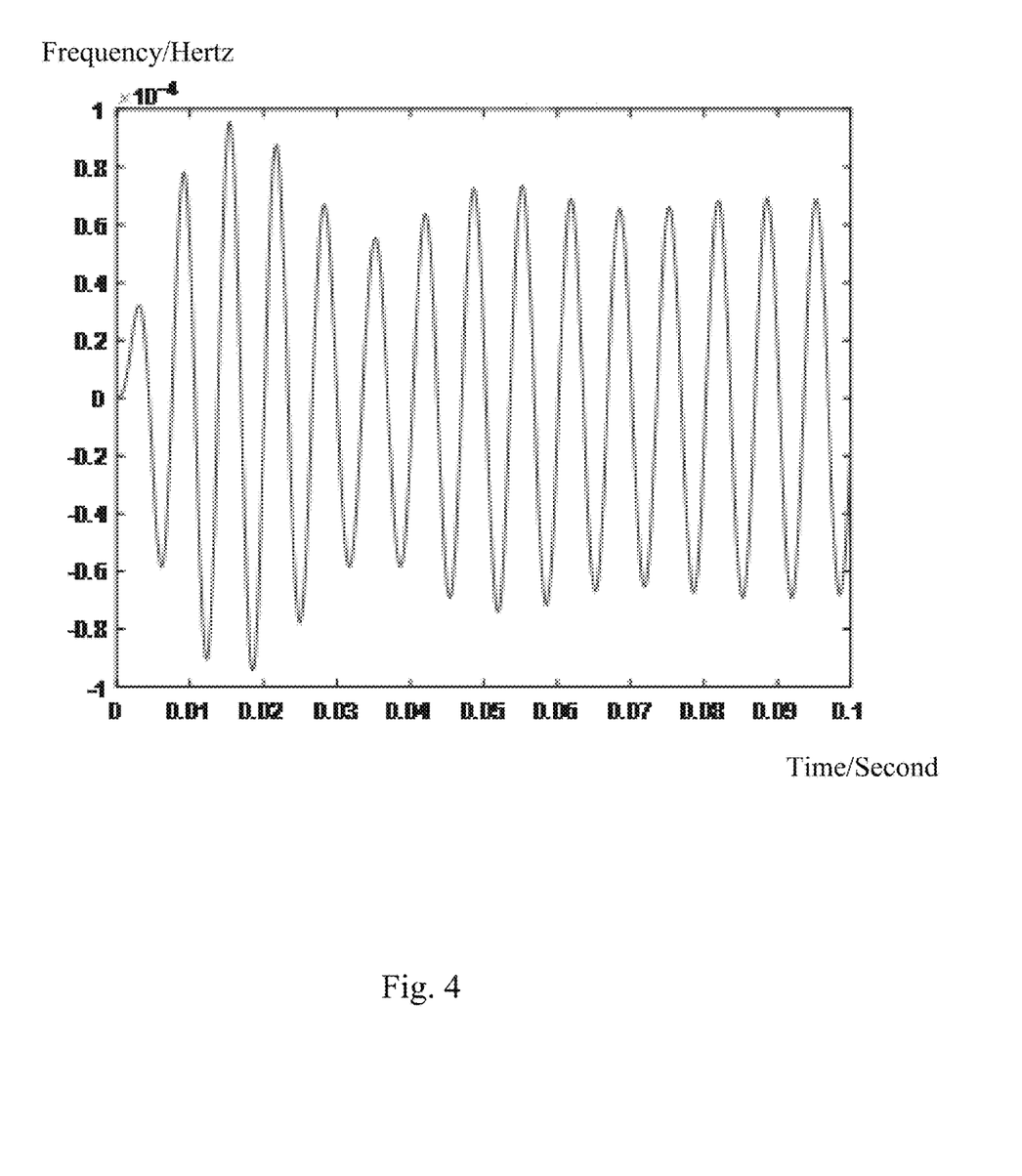
FIG. 4 is a waveform graph of a first output signal according to the second embodiment of the present disclosure.
Figure 5:
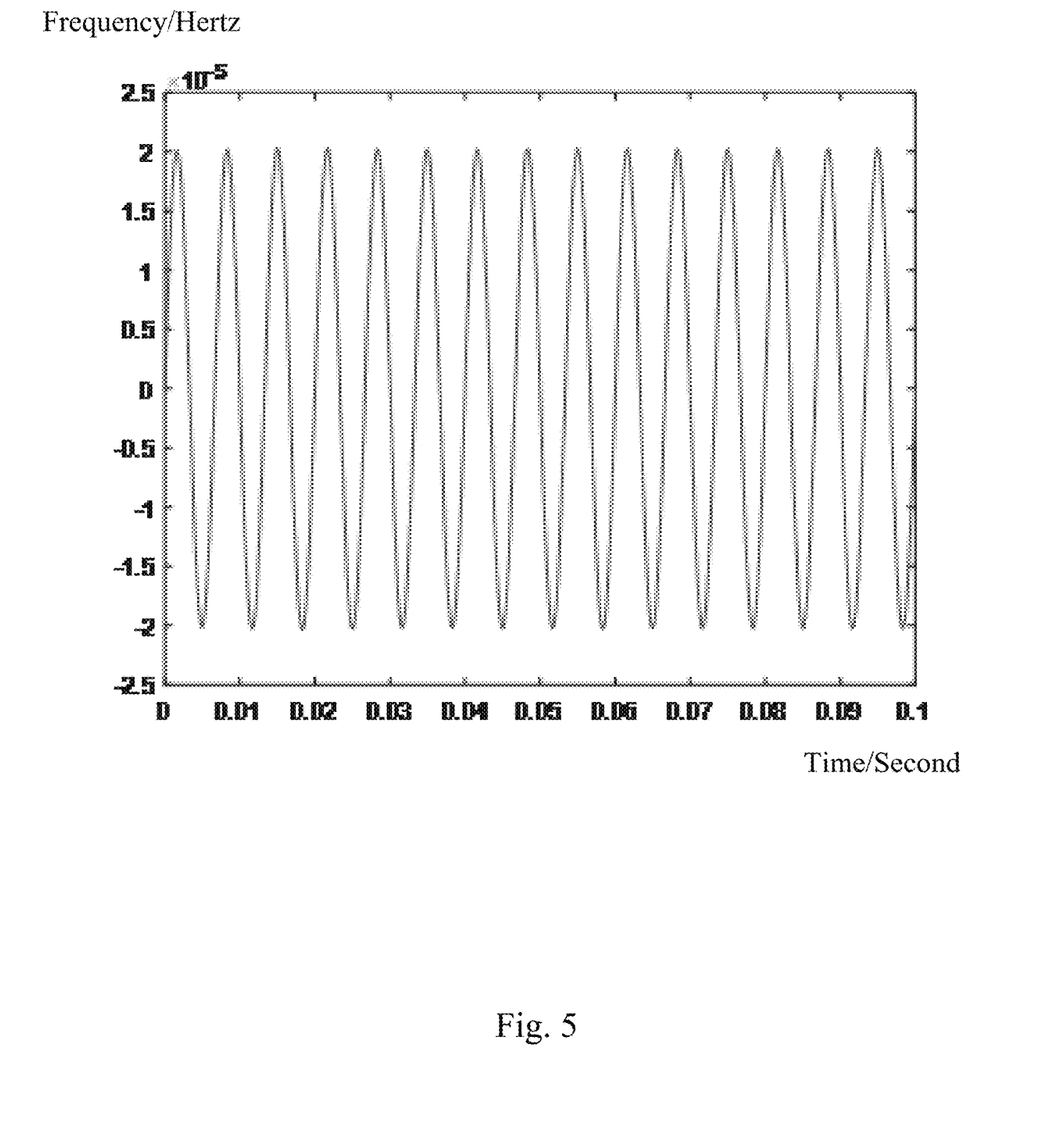
FIG. 5 is a waveform graph of a second output signal according to the second embodiment of the present disclosure.

The effect of the technical solution according to the embodiments of the present disclosure will be described specifically. Taking a motor with parameters $\xi=0.038$, $\omega_n=356$ πrad/s, Bl=0.345N/A, m=0.0017 kg, and $R_\theta=8\Omega$ as an example. FIG. 3, FIG. 4, and FIG. 5 are a waveform graph of a first input signal when the signal parameters are A=1, $\omega_c=300$ πrad/s, a waveform graph of an output signal when the first input signal is directly input into the second system, and a waveform graph of an output signal when the first input signal is firstly input into and processed by the first system and then input into and processed by the second system, respectively. As shown in FIG. 3, the curve represents the waveform graph of the first input signal. As shown in FIG. 4, the curve represents the waveform graph of the first output signal when the first input signal is directly input into the second system. As shown in FIG. 5, the curve represents the waveform graph of the second output signal when the first input signal is firstly input into and processed by the first system and then input into and processed by the second system.

Figure 6:
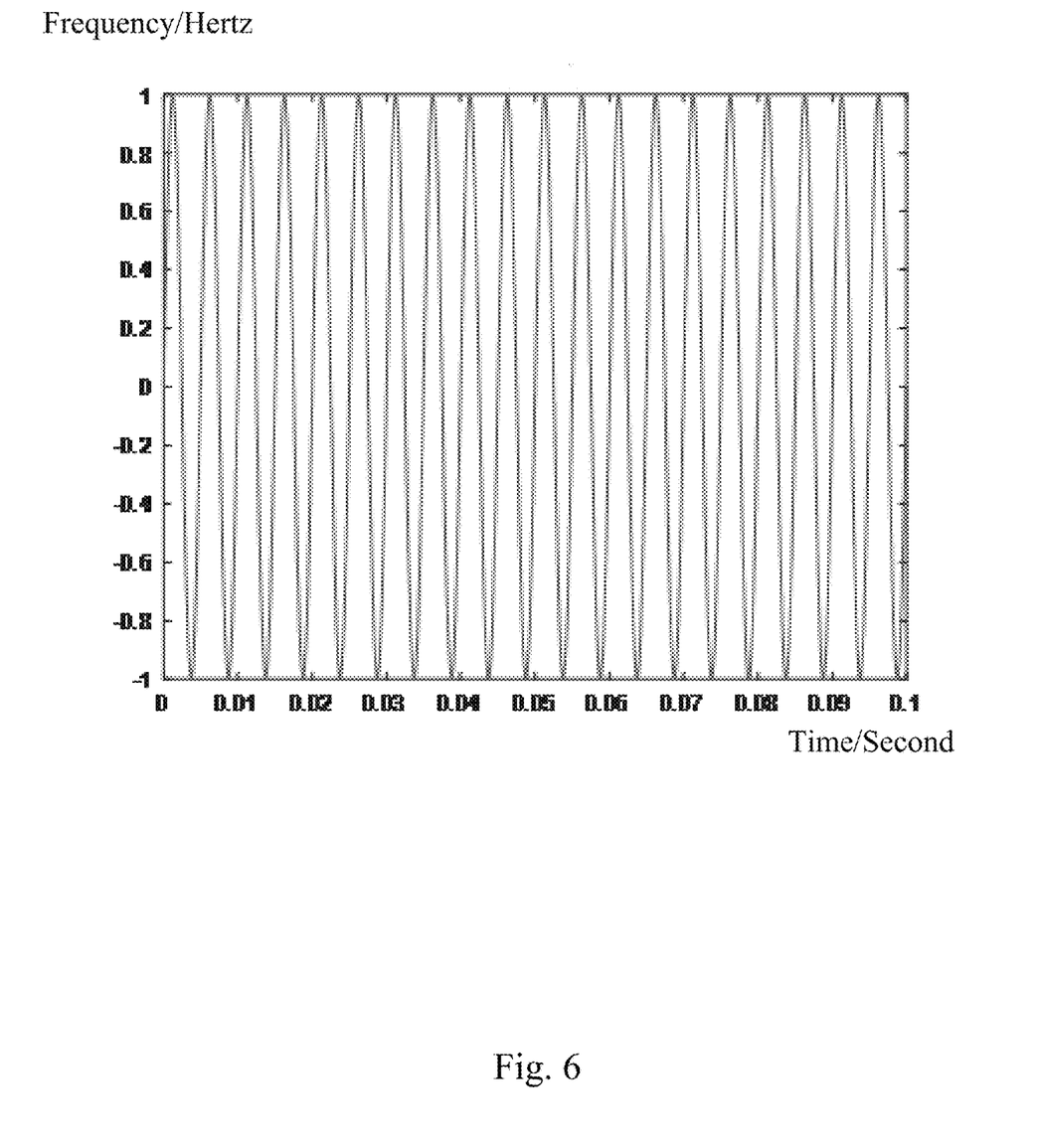
FIG. 6 is a waveform graph of a second input signal according to the second embodiment of the present disclosure.
Figure 7:
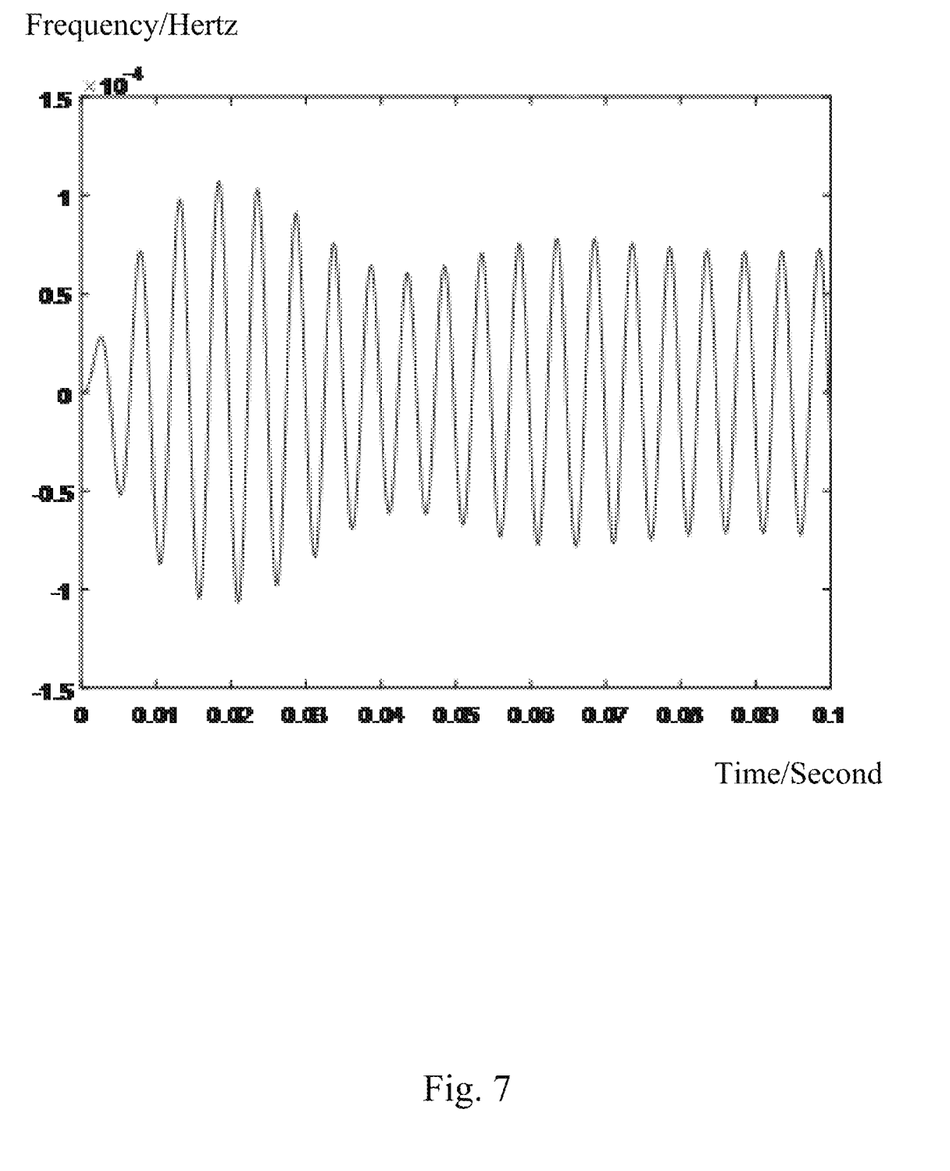
FIG. 7 is a waveform graph of a third output signal according to the second embodiment of the present disclosure.
Figure 8:
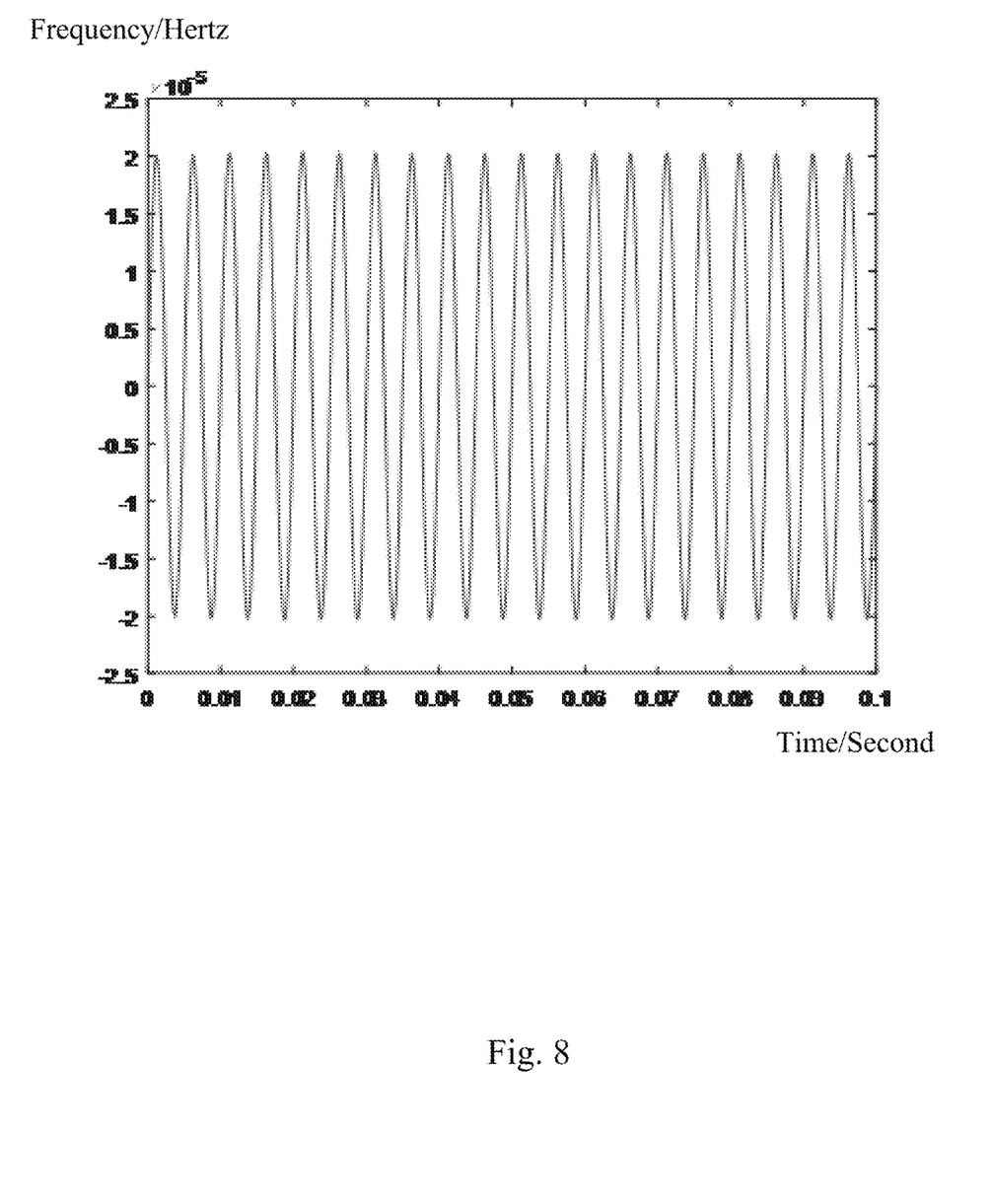
FIG. 8 is a waveform graph of a fourth output signal according to the second embodiment of the present disclosure.

FIG. 6, FIG. 7, and FIG. 8 are a waveform graph of a second input signal when the signal parameters are A=1, $\omega_c=400$ πrad/s, a waveform graph of an output signal when the second input signal is directly input into the second system, and a waveform graph of an output signal when the second input signal is firstly input into and processed by the first system and then input into and processed by the second system, respectively. As shown in FIG. 6, the curve represents the waveform graph of the second input signal. As shown in FIG. 7, the curve represents the waveform graph of the third output signal when the second input signal is directly input into the second system. As shown in FIG. 8, the curve represents the waveform graph of the fourth output signal when the second input signal is firstly input into and processed by the first system and then input into and processed by the second system.

Those skilled in the art would understand that, in the second embodiment of the present disclosure, a correction input signal is obtained by obtaining a non-resonance frequency sine signal, inputting the non-resonance frequency sine signal into the first system and processing the non-resonance frequency sine signal input into the first system, and then the correction input signal is input into and processed by the second system, thereby obtaining the output signal in the same mathematical form as the non-resonance frequency sine signal, that is, the output signal of the motor. The first system is the inverse system of the second system, and thus, the product of the system transfer functions of the first system and the second system is a constant, so that the phase and frequency of the non-resonance frequency sine signal would not change after being processed by the first system, in other words, the correction input signal is in the same mathematical form as the non-resonance frequency sine signal. The correction input signal is then input into the second system for further processing, and the obtained output signal is also in the same mathematical form as the non-resonance frequency sine signal, in other words, the frequency of the output signal is the same as the that of the non-resonance frequency sine signal, thereby avoiding a phenomenon of rapid rise and fall caused by the frequency difference of the output signal and the frequency of the non-resonance frequency sine signal, and thus the motor has a smooth output.

The division of steps in the foregoing methods is only for clear description. When the steps are implemented, they may be combined into one step, or some of the steps may be split into a plurality of steps, all of the above fall within the protection scope of the present disclosure provided that the steps include the same logical relationship. Adding insignificant modifications or introducing insignificant designs to the algorithm or process without changing the core design thereof shall be considered as falling within the protection scope of the present disclosure.

Figure 9:
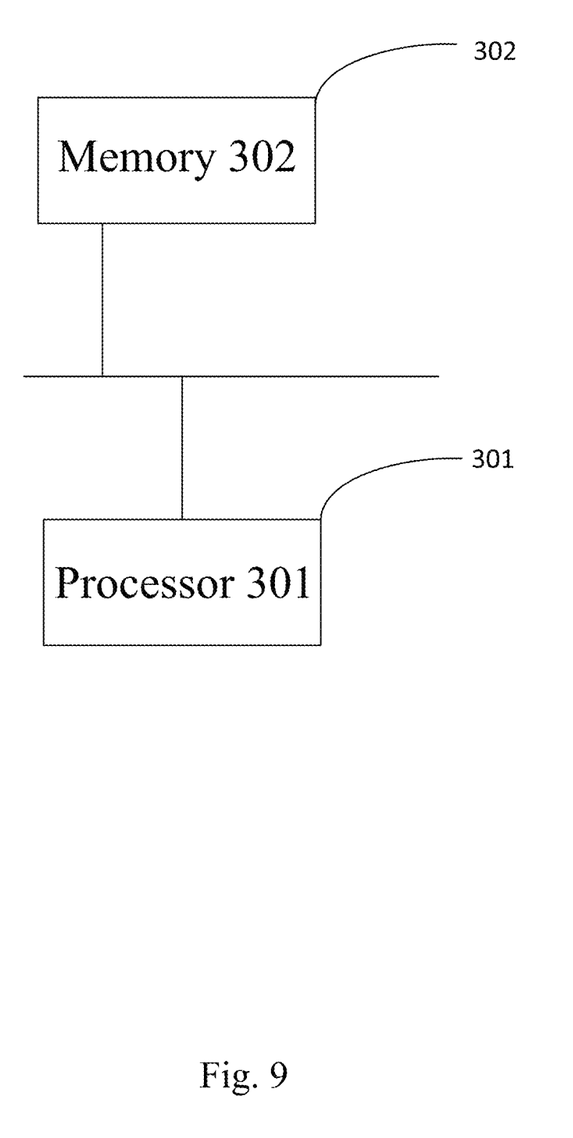
FIG. 9 is a schematic structural diagram of an apparatus for generating a motor drive signal according to the third embodiment of the present disclosure.

The third embodiment of the present disclosure relates to an apparatus for generating a motor drive signal. As shown in FIG. 9, the apparatus includes:

at least one processor 301; and a memory 302 communicatively connected with the at least one processor 301, wherein, an instruction executable by the at least one processor 301 is stored in the memory 302, and the instruction is executed by the at least one processor 301, so that the at least one processor 301 may perform the method for generating a motor drive signal according to the first and the second embodiments.

The memory 302 and the processor 301 are connected to each other via a bus. The bus may include any number of interconnected buses and bridges. The bus connects one or more processors 301 to various circuits of the memory 302. The bus may further connect various other circuits (such as peripheral devices, a voltage regulator, and a power management circuit) together. These are all commonly known in the art and thus will not be described in this description. A bus interface provides an interface between the bus and a transceiver. The transceiver may be one component, or may be a plurality of components, for example, a plurality of receivers and transmitters, and it provides a unit for communicating with various other apparatuses via a transmission medium. Data processed by the processor 301 is transmitted via a wireless medium by using an antenna. Further, the antenna further receives data and sends the data to the processor 301.

The processor 301 is used for bus management and general processing, and it may further provides various functions, including timing, a peripheral interfacing, voltage adjusting, power supply management, and other control functions. The memory 302 may be configured to store data for the processor 301 to perform operations.

The fourth embodiment of the present disclosure relates to a computer readable storage medium for storing a computer program. When being executed by a processor, the computer program performs methods according to the foregoing embodiments.

Those skilled in the art would understand that all steps or some of the steps in the methods in the foregoing embodiments may be implemented by related hardware instructed by the program. The program is stored in a storage medium, and includes several instructions to enable a device a single-chip microcomputer, a chip, or the like) or a processor to perform all steps or some of the steps in the methods in the embodiments of the present disclosure. The above storage medium may include: any medium that may store program code, such as a USB flash drive, a removable hard disk, a read-only memory (ROM), a random access memory (RAM), a magnetic disk, or a compact disc.

Those skilled in the art would understand that, the foregoing embodiments are specific embodiments for implementing the present disclosure. However, during actual applications, various changes may be made to the foregoing embodiments in terms of form and details, without departing from the spirit and the scope of the present disclosure.

What is claimed is:

1. An apparatus comprising:
a motor for providing vibration sense to a user; and
a processor for generating a motor drive signal to drive the motor, configured to perform:
  obtaining a non-resonance frequency sine signal;
  inputting the non-resonance frequency sine signal into a first system;
  the first system processing the non-resonance frequency sine signal to obtain a correction input signal;
  inputting the correction input signal into a second system;
  the second system processing the correction input signal to obtain an output signal in the same mathematical form as the non-resonance frequency sine signal, wherein the first system is an inverse system of the second system; and
  providing the output signal as the motor drive signal to the motor.

2. The apparatus according to claim 1, wherein the relationship between the first system and the second system is represented as:

$$H_K^{-1}(s) = \frac{K}{H(s)},$$

wherein $H_K^{-1}(s)$ represents the first system, $H(s)$ represents the second system, and K is a constant scale factor.

3. The apparatus according to claim 2, wherein the constant scale factor K is calculated by the following formula:

$$K = \frac{Bl}{mR_\theta \omega_n^2},$$

wherein, m is a mass of a spring vibrator, B is magnetic induction intensity, l is a length of an energized wire, $R_\theta$ is a loop resistance, and con is an undamped natural frequency.

4. The apparatus according to claim 1, wherein the first system processing the non-resonance frequency sine signal to obtain a correction input signal comprises:
  inputting the non-resonance frequency sine signal into a first preset conversion unit and a second preset conversion unit, respectively;
  the first preset conversion unit converting the non-resonance frequency sine signal into a first component signal;
  the second preset conversion unit converting the non-resonance frequency sine signal into a second component signal; and
  obtaining the correction input signal according to the first component signal and the second component signal.

5. The apparatus according to claim 4, wherein the first preset conversion unit converting the non-resonance frequency sine signal into a first component signal comprises:
  a cophase component operational amplifier adjusting amplitude of the non-resonance frequency sine signal to obtain a cophase component signal, wherein the cophase component signal is in a form of $v_1(t)=A_1 \sin \omega_c t$, wherein
  $v_1(t)$ is the cophase component signal, $A_1$ is the amplitude of the cophase component signal, and $\omega_c$ is the angular velocity of the non-resonance frequency sine signal.

6. The apparatus according to claim 4, wherein the second preset conversion unit converting the non-resonance frequency sine signal into a second component signal comprises:
  a phase shift circuit changing a phase of the non-resonance frequency sine signal by a preset angle; and
  a quadrature component operational amplifier adjusting an amplitude of the phase changed non-resonance frequency sine signal to obtain a quadrature component signal, wherein the quadrature component signal is in a form of $v_2(t)=A_2 \cos \omega_c t$, wherein
  $v_2(t)$ is the quadrature component signal, $A_2$ is the amplitude of the quadrature component signal, and $\omega_c$ is an angular velocity of the non-resonance frequency sine signal.

7. The apparatus according to claim 4, wherein the obtaining the correction input signal according to the first component signal and the second component signal comprises:
  adding the first component signal and the second component signal together to obtain the correction input signal.

8. The apparatus according to claim 4, wherein the obtaining the correction input signal according to the first component signal and the second component signal comprises:
  setting a correction pulse signal according to the first component signal and the second component signal; and
  adding the first component signal, the second component signal and the correction pulse signal together to obtain the correction input signal.

* * * * *